US010861615B2

(12) United States Patent
Torgue et al.

(10) Patent No.: US 10,861,615 B2
(45) Date of Patent: Dec. 8, 2020

(54) METHOD AND APPARATUS FOR THE PRODUCTION OF HIGH PURITY RADIONUCLIDES

(71) Applicant: Orano Med, Courbevoie (FR)

(72) Inventors: Julien Torgue, Gaithersburg, MD (US); Patrick Bourdet, Versailles (FR); Gilbert Andreoletti, Equeurdreville-Hainneville (FR); Rémy Dureau, Couzeix (FR); Patrick Maquaire, Tourlaville (FR)

(73) Assignee: ORANO MED, Courbevoie (FR)

( * ) Notice: Subject to any disclaimer, the term of this patent is extended or adjusted under 35 U.S.C. 154(b) by 0 days.

(21) Appl. No.: 15/778,397

(22) PCT Filed: Nov. 22, 2016

(86) PCT No.: PCT/EP2016/078373
§ 371 (c)(1),
(2) Date: May 23, 2018

(87) PCT Pub. No.: WO2017/093069
PCT Pub. Date: Jun. 8, 2017

(65) Prior Publication Data
US 2018/0350480 A1    Dec. 6, 2018

(30) Foreign Application Priority Data

Nov. 30, 2015   (EP) .................................... 15306897

(51) Int. Cl.
*G21G 1/00*   (2006.01)
*B01D 15/20*   (2006.01)
(Continued)

(52) U.S. Cl.
CPC ........... *G21G 1/0005* (2013.01); *B01D 15/20* (2013.01); *B01D 15/362* (2013.01);
(Continued)

(58) Field of Classification Search
CPC .................................................. B01D 15/362
See application file for complete search history.

(56) References Cited

U.S. PATENT DOCUMENTS

| 3,561,932 A | * | 2/1971 | Gruverman et al. .. C01G 15/00 |
| | | | 423/132 |
| 4,597,951 A | * | 7/1986 | Gennaro .................. G21G 4/08 |
| | | | 423/2 |

(Continued)

FOREIGN PATENT DOCUMENTS

| WO | WO03086569 | 10/2003 |
| WO | WO2013179949 | 11/2013 |

OTHER PUBLICATIONS

Corresponding Search Report for EP15306897.

*Primary Examiner* — Melissa S Swain
(74) *Attorney, Agent, or Firm* — Davidson, Davidson & Kappel, LLC

(57) ABSTRACT

A process for producing a daughter radionuclide from a parent radionuclide includes a) loading the parent radionuclide on a first solid medium contained in a generator and onto which the parent radionuclide is retained and whereby the daughter radionuclide is formed by radioactive decay of the parent radionuclide; b) eluting this medium with a A0 solution so as to recover a A1 solution comprising the daughter radionuclide; c) optionally adjusting the pH of the A1 solution so as to obtain a A1' solution, d) loading this A1 or A1' solution onto the head of a second solid medium contained in a chromatography column; e) first washing said second solid medium with a A2 solution; f) second washing said second solid medium with a A2' solution; g) eluting the daughter radionuclide with a A3 solution. The first washing step is conducted from head to tail of the column and the second washing step and the second eluting step are conducted from tail to head of the column.

13 Claims, 11 Drawing Sheets

(51) Int. Cl.
    *B01D 15/36*     (2006.01)
    *B01D 15/42*     (2006.01)
    *C22B 60/02*     (2006.01)
    *G21G 4/08*     (2006.01)

(52) U.S. Cl.
    CPC ........ B01D 15/426 (2013.01); C22B 60/0291 (2013.01); G21G 4/08 (2013.01); *G21G 2001/0094* (2013.01)

(56) References Cited

U.S. PATENT DOCUMENTS

| | | | | |
|---|---|---|---|---|
| 4,663,129 | A * | 5/1987 | Atcher | G21G 4/08 |
| | | | | 250/432 PD |
| 5,382,388 | A * | 1/1995 | Ehrhardt | G21G 4/08 |
| | | | | 252/635 |
| 6,787,041 | B2 * | 9/2004 | Chwirka | C02F 1/281 |
| | | | | 210/668 |
| 6,787,042 | B2 | 9/2004 | Bond et al. | |
| 7,554,095 | B2 * | 6/2009 | Fuse | B82Y 10/00 |
| | | | | 250/396 R |
| 2005/0236331 | A1 * | 10/2005 | Betenekov | G21G 1/0005 |
| | | | | 210/656 |
| 2008/0258076 | A1 * | 10/2008 | O'Hara | B01J 20/22 |
| | | | | 250/430 |
| 2010/0278727 | A1 * | 11/2010 | Scheinberg | A61K 51/1069 |
| | | | | 424/1.49 |
| 2014/0369903 | A1 * | 12/2014 | Cutler | B01D 15/265 |
| | | | | 423/2 |
| 2015/0098901 | A1 * | 4/2015 | Birnbaum | A61K 51/00 |
| | | | | 424/1.49 |
| 2016/0209387 | A1 * | 7/2016 | Hjellum | B01D 15/08 |

\* cited by examiner

METHOD AND APPARATUS FOR THE PRODUCTION OF HIGH PURITY RADIONUCLIDES

The present invention concerns the field of production of high grade radionuclides, suitable in particular for medical use.

More specifically, it relates to a process for producing high grade lead 212, as well as an apparatus specially designed for conducting said process automatically.

BACKGROUND

Radionuclides have been shown to be promising candidates in the medical field, such as in imaging and radiotherapy, notably radioimmunotherapy for the treatment of cancers.

In particular, lead 212 has been the subject of intensive developments in these applications and the production of high purity lead 212 has thus become a prerequisite.

In this context, several processes have been developed.

As illustrated in FIG. 1, which represents the radioactive decay chain of uranium 232 and thorium 232, lead 212 belongs to the thorium 232/uranium 232 radioactive family of which it is a daughter product. It is also a daughter product of radium 224 which, in this chain, falls between thorium 232/uranium 232 and lead 212.

Back in the 80's, U.S. Pat. No. 4,663,129 suggested a process for producing lead 212 from radium 224, where only one system is used to generate lead 212 from radium 224, followed by elution of bismuth 212 and lead 212 by conducting a series of acid digestions with various acid elution solutions.

However, this part of the process is not self-contained and requires the intervention of an operator. Further, in effect, this process does not allow achieving a purity of more than 99.5%, which is no longer sufficient considering the current medical requirements.

Further, in this process, radium 224 is obtained from thorium 228 on a basic anion exchange column.

WO03/086569 discloses a system where the parent radionuclide is eluted from the extraction medium whereas the daughter radionuclide is retained by the system.

U.S. Pat. No. 6,787,042 discloses a process where a daughter radioisotope solution obtained from a generator loaded with the parent isotope is transferred to a separate extracting medium to purify the daughter from the parent radioisotope.

More recently, WO2013/174949 discloses a method for producing high purity lead 212 from radium 224 where radium 224 is bound to a cation exchange resin and a aqueous solution A1 of lead 212 is eluted therefrom and further purified through a chromatography column which is first washed with an acid solution A2 and then eluted with a third A3 solution, with a pH gradient.

However, the purity of the final product still needs to be improved. In particular, this process involves high volumes of a plurality of solutions which may introduce further potential impurities in the final product.

SUMMARY OF THE INVENTION

There is thus still a need to provide a process for producing radionuclides, such as lead 212, which
achieves a high level of purity,
may be easily automated, and/or
may be implemented without contaminating the operating staff.

It would also be desirable to have available an apparatus that makes it possible to implement this method in an automated manner and in a closed system.

These goals and others may be achieved by the present invention.

A method for producing lead 212 for medical use is provided, as well as an apparatus specially designed for automated implementation in a closed system of this method.

A process for producing a daughter radionuclide from a parent radionuclide is provided comprising the steps of:
a) loading the parent radionuclide on a first solid medium contained in a generator and onto which the parent radionuclide is bound and whereby the daughter radionuclide is formed by radioactive decay of the parent radionuclide;
b) eluting this medium with a A0 solution so as to recover a A1 solution comprising the daughter radionuclide;
c) optionally adjusting the pH of the A1 solution so as to obtain a A1' solution,
d) loading this A1 or A1' solution onto the head of a second solid medium contained in a chromatography column;
e) first washing said second solid medium with a A2 solution;
f) second washing said second solid medium with a A2' solution;
g) eluting the daughter radionuclides with a A3 solution, characterized in that in the chromatography column the first washing step is conducted from head to tail of the column and the second washing step and the second eluting step are conducted from tail to head of the column.

The process of the invention may include one or more preliminary steps so as to provide the desired parent radionuclide, for instance to obtain the parent radionuclide from the radionuclide available as starting product ("the source radionuclide") when the parent radionuclide is downstream the source radionuclide in the decay chain.

This may be achieved by generating the desired parent radionuclide from a source radionuclide in a generator, where the source radionuclide is retained and from which the parent radionuclide can be eluted.

Thus, once extracted from the generator, the daughter radionuclide is subjected to a liquid chromatography on a column, with a unique combination of backward second washing and eluting steps, whereas the loading and first washing steps are conducted frontward. This makes it possible to eliminate very efficiently both radiological and chemical impurities, which are extracted from the generator jointly with the daughter radionuclide, and to achieve a high chemical and bacteriological purity through the steps on the chromatography column.

According to the process, the daughter radionuclide can be obtained with improved radiological, chemical and bacteriological grades.

In particular the process herein differs from that of WO2013/17949 in that a further second washing step is introduced and said second washing step and the elution step are conducted in an inverted way, that is from tail to head of the column, by contrast to the washing and eluting steps disclosed in WO2013/174949.

It was found unexpectedly that the combinations of these distinctive features allowed smaller amounts of the washing and eluting A2' and A3 solutions, thus shortening the duration of the purification and introducing less potential contaminants, thus increasing the purity of the daughter radionuclide eventually obtained. Another advantage is that the column may be repetitively used without changing the resins, as the side products are discarded according to the process.

Still further, the process leads to products concentrated in the daughter radionuclide.

It has been also hypothesized that the better efficacy could also be associated in particular with the avoidance of possible clogging within of the column.

Moreover, as the liquid chromatography on a column is a technique that can be automated and coupled to the production from the generator, which is itself a technique that can be automated, this means the process offers a method that can be implemented in an automated mode.

In addition, as the liquid chromatography on a column and the production of radionuclide in a generator are techniques based on the circulation of liquid media through solid media, they can both be implemented in a closed system.

As used herein:

The terms "radionuclide", "radioisotope" are used interchangeably and refer to a nuclide that is radioactive, subject to undergoing radioactive decay.

"Radioactive decay" also known as nuclear decay or radioactivity, is the process by which a nucleus of an unstable atom loses energy by emitting ionizing radiation, resulting in the formation of a new nuclide together with the emission of ray(s).

A "parent radionuclide" is a species which undergoes radioactive decay and leads to the formation of a "daughter radionuclide".

A "daughter radionuclide" is a species that is formed following radioactive decay of a parent radionuclide.

A parent radionuclide and a daughter radionuclide may be adjacent ((ie) the parent's decay leads directly to its daughter), or not (there is one or more species between the parent and the daughter radionuclide in the decay chain). In other words, the expression "parent radionuclide" encompasses all species located in successive ranks upstream the daughter radionuclide in the decay chain, whereas a parent radionuclide may give rise to one or more daughter radionuclides in successive ranks downstream the decay chain.

"Radiotherapy" refers to any therapy using ionizing radiation, generally as part of cancer treatment to control or kill malignant cells. It includes both curative and adjuvant therapy.

"Radioimmunotherapy" (RIT) refers to any therapy where an antibody is associated with a radionuclide to deliver cytotoxic radiation to a target cell. In cancer therapy, an antibody with specificity for a tumor-associated antigen is used to deliver a lethal dose of radiation to the tumor cells. The ability for the antibody to specifically bind to a tumor-associated antigen increases the dose delivered to the tumor cells while decreasing the dose to normal tissues. Generally, radioimmunotherapy involves the administration of a product where the radionuclide is bound to the antibody through a chelating agent.

"Purity" refers to chemical, radiological and/or bacteriological purity.

The terms "radiological purity" refer for a radionuclide to the purity this radionuclide presents with regard to the radioelements from which it originates by radioactive decay, as well as with regard to the other radionuclides which are not part of its radioactive decay chain, and not to the purity it presents with regard to the radionuclides which it generates itself through its own radioactive decay.

The radiological impurities include the radionuclides likely to be present in the radioisotope generator, starting with the latter, whereas the chemical impurities include the organic degradation products resulting from radiolysis of the solid media present in the generator or the chromatography column, as well as the organic and mineral contaminants likely to be introduced into these media, for example by the solutions that are used to prepare and extract the daughter radionuclide or adventitious metals naturally present in the environment, in air or in the solution bags.

According to an embodiment, the parent and daughter radionuclides belong to the radioactive decay chain of thorium 232 and/or uranium 232 or from artificial sources. They may be in particular chosen from thorium, radium, lead and bismuth isotopes, more specifically among thorium 228, radium 224 and lead 212 and their mixtures.

According to an embodiment, the daughter radionuclide is lead 212.

According to an embodiment, the parent radionuclide is chosen from radium 224.

In case where radium 224 (the parent radionuclide) is not used as the starting product (the "source radionuclide"), thorium 228 may be used instead as a source radionuclide.

The process then comprises a preliminary step comprising generating radium 224 from thorium 228 in a generator. According to an embodiment, such generator comprises as solid medium DGA (marketed by Triskem). It may be eluted by an acidic solution, such as HCl solution, to recover radium 224 which in turns may be used as the parent radionuclide in step a).

According to an embodiment, the process of the invention may further comprise any additional step to clean the system, such as steps to empty the system and/or to remove any clogging that may have formed in the solid medium. Generally, such cleaning steps may be conducted in a fashion so as to maintain the sterility and purity of the system. Air-flushing is preferred.

According to an embodiment, the process of the invention comprises the step:

h) air-flushing the second solid medium.

Generally, this step may be conducted with sterile filtered air, such as air filtered through a 0.2 µm filter.

The production of the daughter radionuclide from the parent radionuclide in the generator and its extraction from this generator can be carried out, in a manner known per se.

According to an embodiment, the first solid medium may be chosen from any solid media that can retain the parent radionuclide but that do not retain the daughter radionuclide.

According to an embodiment, the first solid medium can be a cation exchange resin that can retain the parent radionuclide but that does not retain the daughter radionuclide. As an illustration, one can cite the resin sold by the company BIO-RAD under the reference AG™ MP50 and which consists of a macroporous matrix of polystyrene/divinylbenzene onto which sulphonic groups —$SO_3H$ are grafted. Such resin is generally appropriate to produce lead 212 from radium 224.

According to an embodiment, the solution comprising the parent radionuclide is an aqueous acid solution. The acid may be chosen from hydrochloric or nitric acid. The concentration is adjusted so as to achieve a pH range where the parent radionuclide may be retained on the first solid medium. Generally, this solution may contain from 1 to 3 moles/L, more specifically 2 moles/L of hydrochloric or nitric acid.

Preferably, the solution comprising the parent radionuclide has a radiological purity greater than or equal to 99.5%.

Following the loading, the first solid medium may be washed by using a further solution, such as an aqueous acid solution. This solution may generally comprise from 0.01 to 2 moles/L, more particularly 0.01 mole/L of hydrochloric or nitric acid.

The parent radionuclide produces the daughter radionuclide by radioactive decay in the generator.

The daughter radionuclide is then eluted through the resin by using an A0 solution.

According to an embodiment, the A0 solution is an aqueous acid solution. The pH is generally adjusted so that the parent radionuclide is retained in the solid medium and the daughter radionuclide is released from the solid medium.

According to an embodiment, the A0 solution may be an aqueous solution containing from 1.5 to 2.5 moles/L and, in particular 2 moles/L of hydrochloric or nitric acid.

Following the elution, an A1 solution comprising the eluted daughter radionuclide is obtained at the tail of the column.

According to an embodiment, the A2 and A2' solutions are similar.

According to an embodiment, the generation of the daughter radionuclide in the generator may comprise the following steps:
loading the cation exchange resin with an acid aqueous solution containing the parent radionuclide,
washing the resin with an aqueous acid solution,
leaving the parent radionuclide to produce the daughter radionuclide by radioactive decay; and
eluting the resin with an aqueous acid solution A0 so as to obtain a A1 solution.

In accordance with an embodiment of the invention, the loading of the stationary phase with the aqueous solution A1 may be carried out without altering the pH of this solution when it is extracted from the parent radionuclide generator.

According to an alternative embodiment, it is also possible to alter the pH of the A1 solution, such as before it is loaded onto the second solid medium present in the chromatography column, so as to increase the retention of the daughter radionuclide by decreasing (by addition of a strong acid) or increasing (by dilution with water and/or addition of a strong base) the pH of the aqueous A1 solution of this stationary phase. An A1' solution is thus obtained.

According to an embodiment, the second solid medium is a stationary phase contained in a column. Generally, the second solid medium selectively retains the daughter radionuclide present in the A1 or A1' solutions, even when contacted with A2 or A2' solution. In other words, it retains the daughter radionuclide present in the A1 and A1' aqueous solutions but does not retain, or practically does not retain, the radiological and chemical impurities also present in the A1, A1', A2, A2' solutions or in the medium.

According to a further embodiment, the second solid medium releases said daughter radionuclide when contacted with the A3 solution.

According to an embodiment, the chromatography is advantageously carried out using the second solid medium in a stationary phase which includes an ether crown as the extractant and, in particular, a dicyclohexano-18-crown-6 or a dibenzo-18-crown-6 whose cyclohexyl or benzyl groups are substituted by one or more C1 to C12 alkyl groups, with a straight or branched chain.

In particular, a stationary phase may be used which comprises 4,4'(5')-di-tert-butylcyclohexano-18-crown-6 as the extractant, such a stationary phase presenting the advantage of selectively retaining over 99% of the daughter radionuclide present in an aqueous solution containing from 1.5 to 2.5 moles/L of a strong acid, which typically corresponds to the types of aqueous solutions that may be used to extract a daughter radionuclide from a parent radionuclide, such as lead 212 from a radium 224 generator.

This type of stationary phase is available in bottles or also packaged in ready-to-use columns or cartridges for chromatography, from the company TRISKEM International under the commercial name "Pb resin".

In accordance with embodiments of the invention, the chromatography is a liquid chromatography.

The liquid chromatography on a column may be chosen from various types of chromatography, such as an extraction chromatography or a partition chromatography, in other words a chromatography which is based on the distribution of the elements that are to be separated between an organic phase, or extractant, and an aqueous phase, the extractant being bound to an inert support and forming with it the stationary phase, whereas the aqueous phase represents the mobile phase.

It is also possible to purify the daughter radionuclide extracted from the generator by liquid chromatography on a column other than extraction chromatography, for example, cation exchange chromatography.

Whatever the type of liquid chromatography chosen and the type of stationary phase used, the purification of the daughter radionuclide on the liquid chromatography on a column generally comprises:
loading the stationary phase with the aqueous solution A1 or A1', to allow the daughter radionuclide present in this solution to be retained by the stationary phase;
washing the stationary phase with an aqueous solution A2,
backward washing with a A2' solution,
Said washing being carried out to eliminate from the stationary phase the radiological and chemical impurities it contains but without releasing the radionuclide;
backward eluting the daughter radionuclide from the stationary phase with an aqueous solution A3, to recover the daughter radionuclide in the form of an aqueous solution,
wherein the backward washing and backward eluting steps are conducted from tail to head of the column whereas the loading and first washing step are conducted from the head of the column.

Generally, the conditions under which these three steps are carried out and, particularly, the pH values of aqueous phases A1, A1', A2 and A3, are suitably chosen as a function of the stationary phase used and/or the nature of the daughter radionuclide.

Thus, for example, in the case where the liquid chromatography on a column is carried out using the previously mentioned "Pb resin" as the stationary phase:
the aqueous solution A1 or A1' advantageously has an acidity corresponding to that of an aqueous solution of a strong acid having a molar concentration ranging from 1.5 to 2.5 and, preferably equal to 2, and corresponds, for example, to an aqueous solution containing from 1.5 to 2.5 moles/L and, more particularly, 2 moles/L of hydrochloric or nitric acid, preferably hydrochloric acid;
the aqueous A2 and A2' solution, identical or different advantageously have an acidity corresponding to that of an aqueous solution of a strong acid of molar concentration ranging from 0.1 to 0.5 and, preferably, equal to 0.5, and corresponds, for example, to an aqueous solution containing from 0.1 to 0.5 mole/L and, more particularly, 0.5 mole/L of hydrochloric or nitric acid;
the aqueous solution A3 advantageously has a pH ranging from 5 to 9 and corresponds, for example, to an aqueous solution of ammonium acetate which preferably contains 0.15 to 1 mole/L and, more particularly, 0.4 mole/L of ammonium acetate.

Generally, the backward elution comprises two stages: a first and a second elution fractions. The first elution fraction aims at increasing the pH and does not contain or contains only few daughter radionuclides. The second elution fraction actually elutes the daughter radionuclide and is enriched in the daughter radionuclide. The first fraction may thus be discarded and the second fraction may be collected.

According to a preferred embodiment, the process of the invention may be conducted to produce lead 212 from radium 224 comprising the following steps:
a) loading radium 224 on a cation exchange resin contained in a generator;
b) eluting with a 2 N hydrochlorid acid solution so as to recover an A1 solution comprising lead 212;
c) loading said A1 solution on the stationary phase at the head of a liquid chromatography column;
d) washing the column from the head to tail with a A2 solution of 0.1 N hydrochlorid acid;
e) washing from the tail to head of the column with the same A2 solution;
f) eluting from the tail to the head of the column with a A3 solution of 0.4 N ammonium acetate to recover lead 212;
g) air flushing.

According to a further object, the present invention also provides lead 212 obtainable by the method of the invention. The so obtained lead 212 has generally a radiological purity of more than 99.95%. As an illustration, lead 212 may be obtained with a purity of more than 99.99%.

According to an embodiment, the method may also comprise a bacteriological purification of the daughter radionuclide, which is preferably carried out after the liquid chromatography on the column, for example by circulating the aqueous solution having been used to elute the daughter radionuclide through a pore filter, e.g. a 0.2 μm pore filter.

According to an embodiment, lead 212 may be obtained with a chemical purity within the following specifications:

Ag, As, Bi, Cd, Cu, Hg, Mo, Pb, Sb, Sn<2 ppm (ie)<2 mg/L

Pb<0.2 ppm (ie)<200 μg/L
Fe<0.3 ppm (ie)<300 μg/L
Th<10 ppb (ie)<10 μg/L.

Preferably, the whole process is implemented within a closed system or circuit, that is to say in practice in an apparatus allowing all the aqueous solutions used or produced, from the aqueous solution used for extracting the daughter radionuclide from the generator to the aqueous solution containing the daughter radionuclide eluted from the chromatography column, to circulate in a circuit that is totally isolated from the surrounding environment and, notably, from the ambient air and the potential pollutants contained therein, which contributes to obtaining the daughter radionuclide of very high chemical purity.

Further, the process can be automated, without intervening staff and consequential human errors that may occur.

Apparatus

An apparatus is also provided for the automated production of a daughter radionuclide from a parent radionuclide using a generator comprising a solid medium onto which the parent nuclide is fixed and whereby the daughter nuclide is formed by radioactive decay of the parent nuclide, the apparatus comprising a configurable fluid circuit comprising:
a chromatography column having a head port and a tail port,
at least one connection port for connecting the generator to the fluid circuit,
at least one inlet port for connecting fluid sources to the fluid circuit,
at least one valve controlled by an electronic control unit for selectively connecting the chromatography column, the connection port and the inlet port(s) in various configurations,
wherein the fluid circuit comprises a first elution configuration for circulating an A1 solution exiting the generator and containing the daughter radionuclide, through the chromatography column from head port to tail port for loading the chromatography column with the daughter radionuclide, and at least one configuration for circulating a fluid through the chromatography column from tail port to head port.

According to an embodiment, the fluid circuit in the first elution configuration is configured for circulating an A0 solution from an inlet port and through the generator and for circulating the A1 solution exiting the generator through the chromatography column from head port to tail port.

According to an embodiment, the fluid circuit comprises a first washing configuration for circulating an A2 washing solution from an inlet port through the chromatography column from head port to tail port.

According to an embodiment, the fluid circuit comprises a second washing configuration for circulating an A2' washing solution from an inlet port through the chromatography column from tail port to head port.

According to an embodiment, the fluid circuit comprises a second elution configuration for circulating an A3 elution solution from an inlet port through the chromatography column from tail port to head port.

According to an embodiment, the fluid circuit comprises a flushing configuration for circulating air through the fluid circuit for flushing the fluid circuit with air.

According to an embodiment, the electronic control unit is configured for controlling the valve(s) for configuring the fluid circuit in the first elution configuration, the first washing configuration, the second washing configuration and the second elution configuration.

According to an embodiment, the electronic control unit is configured for controlling the valve(s) for configuring the fluid circuit in the flushing configuration.

According to an embodiment the fluid circuit comprises an outlet port for collecting a solution recovered from the head of the chromatography column and/or a waste outlet port for collecting waste by-products recovered from the tail port and/or the head port of the chromatography column.

According to an embodiment the fluid circuit comprises a distribution valve arranged and configured for directing fluid selectively to a head port of the chromatography column for a circulation of the fluid through the chromatography column from the head port to the tail port or to the tail port of the chromatography column for a circulation of the fluid through the chromatography column from tail port to head port.

According to an embodiment the fluid circuit comprises a head valve at the head port of the chromatography column and a tail valve at the tail port of the chromatography column, the distribution valve being arranged and configured for directing fluid selectively to the head valve or to the tail valve.

According to an embodiment the fluid circuit comprises two connection ports, including an inlet connection port for connection to an inlet of the generator and an outlet connection port for connection to an outlet of the generator.

According to another aspect, an automated apparatus is provided comprising a fluid circuit comprising a chromatography column and at least one valve controlled by an electronic control unit, the fluid circuit having various configurations depending on the valve actuation, wherein the fluid circuit comprises at least one configuration for circulating a fluid through the chromatography column in a first direction, from head to tail, and at least one configuration for circulating a fluid through the chromatography column in a second direction opposed to the first direction, from tail to head.

DETAILED DESCRIPTION OF SPECIFIC EMBODIMENTS

Figure 1:
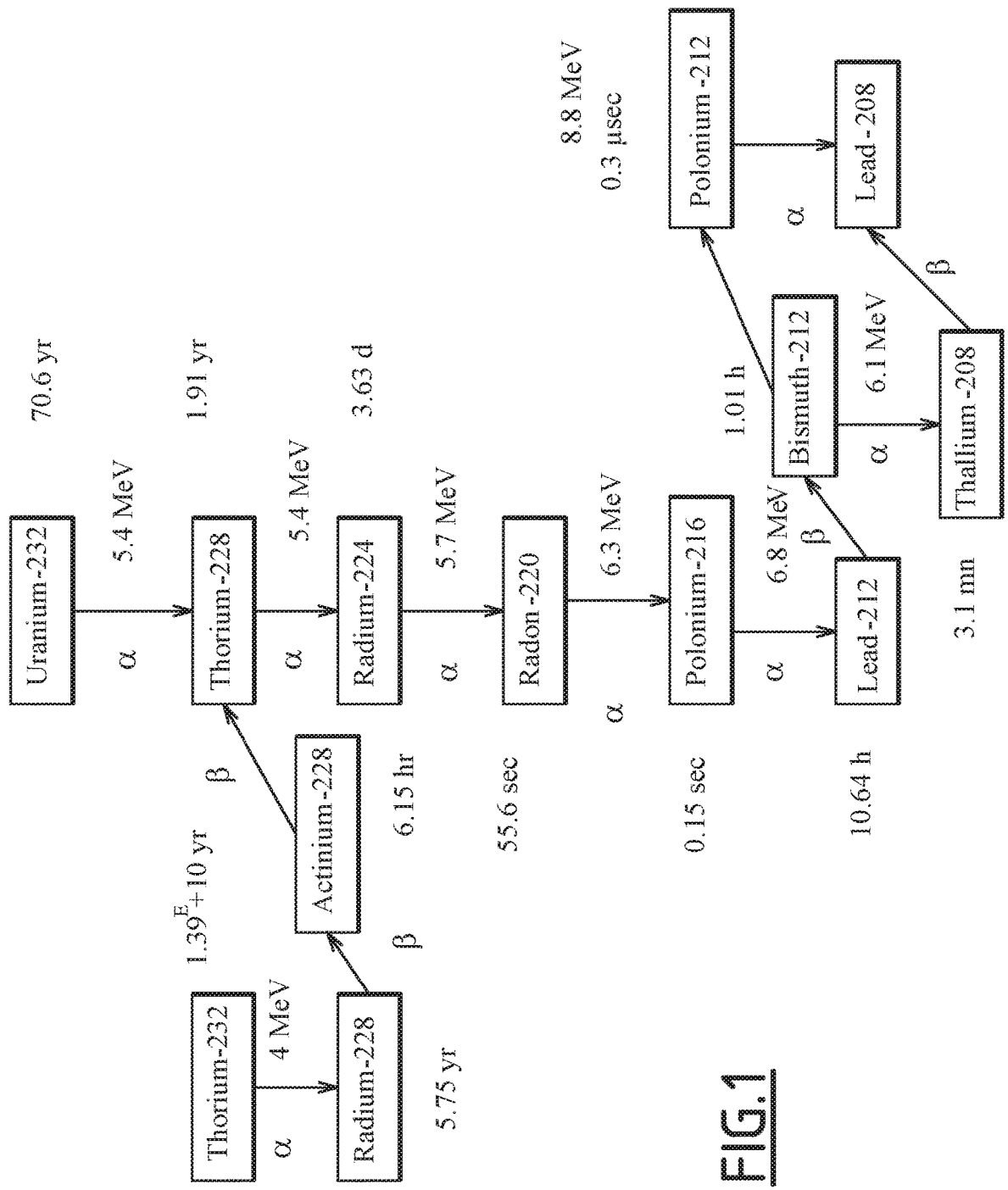
FIG. 1 represents the radioactive decay chain of thorium 232.

The apparatus 20 of FIGS. 2-6 is configured for the automated production of a daughter radionuclide from a parent radionuclide using a generator 22 comprising the first solid medium onto which the parent radionuclide is fixed and whereby the daughter radionuclide is formed by radioactive decay of the parent radionuclide.

In a known manner, the generator 22 comprises a container containing a first solid medium previously loaded with the parent radionuclide, the container allowing circulation of a solution through the container in contact with the solid medium. The generator 22 has ports for fluid connection of the container to a fluid circuit.

In one embodiment, the first solid medium is loaded with radium 224 for the production of lead 212 by radioactive decay of this radium. The radium preferably has a radiological purity greater than or equal to 99.5%.

The apparatus 20 comprises a fluid circuit 24 comprising a chromatography column 26, generator connection ports 28A, 28B for connecting the generator 22 to the fluid circuit 24, solution inlet ports 30A, 30B, 30C, 30D for connecting solution sources S0, S2, S3, S4 to the fluid circuit 24, and automatically actuated valves 32, 34, 36, 38, 40, 42 controlled by an electronic control unit 44.

The fluid lines are illustrated in continuous lines and the control lines connecting the control unit 44 to the components of the fluid circuit 24 are illustrated as dashed lines.

The fluid circuit 24 comprises two connection ports 28A, 28B, including an inlet connection port 28A for connection to an inlet of the generator 22 and an outlet connection port 28B for connection to an outlet of the generator 22.

The apparatus 20 also comprises a product outlet port 46 for receiving a solution containing the daughter radionuclide and a waste outlet port 48 for receiving waste by-products.

The apparatus comprises fluid lines fluidly connecting the chromatography column 26, the connection ports 28A, 28B, the inlet ports 30A, 30B, 30C, 30D, the valves 32, 34, 36, 38, 40, 42, and the outlet ports 46, 48.

The chromatography column 26 is provided for purifying, by a liquid chromatography, the daughter radionuclide extracted from the generator 22, from the radiological and chemical impurities which are extracted from this generator jointly with the daughter radionuclide.

This chromatography column 26 can be either a column that has been previously prepared, conditioned and calibrated, or a commercially available ready-to-use column.

In all cases, the chromatography column 26 contains the second solid medium, such as an extraction chromatography stationary phase, which is capable of retaining the daughter radionuclide under certain conditions and also capable of releasing the daughter radionuclide by elution under other conditions.

The chromatography column 26 comprises a head port 26A and a tail port 26B to connect the chromatography column 26 to the fluid circuit 24 of the apparatus 20.

In a preferred embodiment suited to the use of the apparatus 20 in a nuclear medicine department, the sources S0, S2, S3, S4 are syringes or bags filled with a predetermined amount of appropriate fluids which are to be used during the operation of the apparatus 20. Preferably each source is suited to use in nuclear medicine: it has no rubber or silicon grease.

Preferably, all the material in contact with the fluids are compatible with the acids used.

Figure 2:
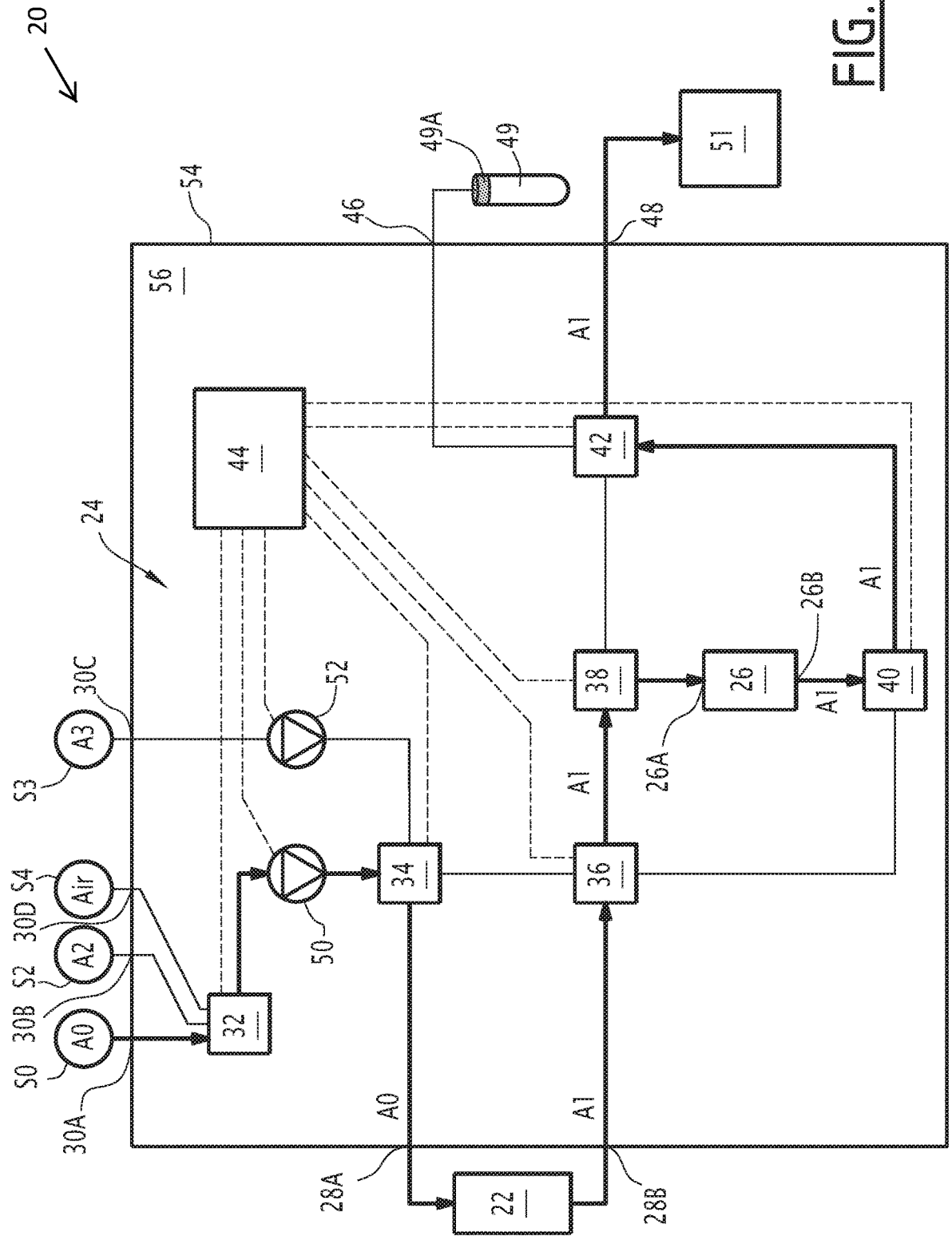
FIGS. 2-6 are diagrammatic representations of an embodiment of an apparatus for implementing the method according to the invention, in different configurations.

In embodiment illustrated on FIG. 2, a first source S0 contains the A0 solution, a second source S2 contains the A2 solution also used as the A2' solution, a third source S3 contains the A3 solution and a fourth source S4 contains filtered air.

The fluid circuit 24 comprises at least one electronically controlled pump arranged for circulating the fluids from the inlet ports 30A, 30B, 30C, 30D and through the fluid circuit 24 in the various configurations. Each pump is controlled by the control unit 44.

The fluid circuit 24 of the apparatus 20 of FIG. 2 comprises a first pump 50 and a second pump 52.

The fluid circuit 24 is configurable for selectively connecting the chromatography column 26, the connection ports 28A, 28B, the inlet ports 30A, 30B, 30C, 30D, the outlet ports 46, 48 and the pumps 50, 52 according to various configurations.

More specifically, the valves 32, 34, 36, 38, 40, 42 are arranged and controlled for selectively connecting the chromatography column 26, the connection ports 28A, 28B and the inlet ports 30A, 30B, 30C, 30D, the outlet ports 46, 48 and the pumps 50, 52 according to different configurations.

The fluid circuit 24 comprises a source selection valve 32 fluidly connected to the inlet ports 30A, 30B, 30D and to an inlet of first pump 50. The inlet ports 30A, 30B, 30D are respectively connected to the first source S0, the second source S2 and the fourth source S4. The selection valve 32 is configured for directing fluid from selectively one of the first source S0, the second source S2 and the fourth source S4 to the inlet of the first pump 50.

The inlet of the second pump 52 is connected to the third source S3.

The fluid circuit 24 comprises a by-pass valve 34 fluidly connected to the outlet of the first pump 50, to the second pump 52, to the inlet connection port 28A and to a distribution valve 36 of the fluid circuit 24. The by-pass valve 34 is configured for selectively directing fluid from the first pump 50 to the inlet connection port 28A, from the first pump to the distribution valve 36 or from the second pump 52 to the distribution valve 36.

The distribution valve 36 is fluidly connected to the by-pass valve 34, to the outlet connection port 28B, to a head valve 38 and a tail valve 40 of the fluid circuit 24. The distribution valve 36 is configured for selectively directing fluid form the by-pass valve 34 to the head valve 38 or from the by-pass valve 34 to the tail valve 40 or from the outlet connection port 28B to the head valve 38.

The head valve 38 is fluidly connected to the distribution valve 36, to a head port 26A of chromatography column 26 and to an outlet valve 42. The head valve 38 is configured for selectively receiving fluid from the distribution valve 36 and providing the fluid to the head port 26A or receiving fluid from the head port 26A and providing the fluid to the outlet valve 42 or receiving fluid from the distribution valve 36 and providing the fluid to the outlet valve 42.

The tail valve 40 is connected to the distribution valve 36, to a tail port 26B of the chromatography column 26 and to the outlet valve 42. The tail valve 40 is configured for selectively receiving fluid from the distribution valve 36 and providing the fluid to the tail port 26B or receiving fluid from the tail port 26B and providing the fluid to the outlet valve 42.

The outlet valve 42 is connected to the head valve 38, to the tail valve 40, to the product outlet port 46 and to the waste outlet port 48. The outlet valve 42 is configured for receiving fluid selectively from the head valve 38 or the tail valve 40 and providing the fluid selectively to the product outlet port 46 or to the waste outlet port 48.

A product flask 49 is connected to the product outlet port 46. Preferably, a filter 49A is placed at the entrance to the product flask 49 to complete the chemical purification of daughter radionuclide by a bacteriological purification. The filter 49A has for example a pore size or pore diameter of 0.2 μm.

A waste receptacle 51 is connected to the waste outlet port 48 for collecting waste by-product solutions from the fluid circuit 24, generated during operation of the apparatus 20.

The different configurations of the fluid circuit 24 are illustrated in FIGS. 2-6, in which the bold fluid lines are the fluid lines in which the fluid circulates and the thin fluid lines are the fluid lines in which no fluid circulates.

In a first elution configuration (FIG. 2), the fluid circuit 24 is configured for circulating the A0 solution from the inlet port 30A and through the generator 22 to recover the A1 solution containing the daughter radionuclide and for circulating the A1 solution from the generator 22 through the chromatography column 26 frontward from head to tail.

In the first elution configuration, the valves 32, 34, 36, 38, 40, 42 are controlled such that the A0 solution flows from the first source S0 successively through the valve 32, through the first pump 50, through the by-pass valve 34 and through the generator 22, and the A1 solution exiting the generator 22 flows through the distribution valve 36, through the head valve 38, through the chromatography column 26 from head port 26A to tail port 26B, through the tail valve 40, through the outlet valve 42 and to the waste outlet port 48.

In a frontward washing configuration (FIG. 3), the fluid circuit 24 is configured for circulating the A2 solution from the second source S2 through the chromatography column 26 from head port 26A to tail port 26B.

In the frontward washing configuration, the valves 32, 34, 36, 38, 40, 42 are controlled such that the A2 solution flows from the second source S2 successively through the valve 32, through the first pump 50, through the by-pass valve 34, through the distribution valve 36, through the head valve 38, through the chromatography column 26 from head port 26A to tail port 26B, through the tail valve 40, through the outlet valve 42 and to the waste outlet port 48. In the frontward washing configuration, the generator 22 is by-passed.

In a backward washing configuration (FIG. 4), the fluid circuit 24 is configured for circulating the A2' solution through the chromatography column 26 from tail port 26B to head port 26A. The A2' solution is here the same as the A2 solution and is circulated from the second source S2.

In the backward washing configuration, the valves 32, 34, 36, 38, 40, 42 are controlled such that the A2' solution flows from the second source S2 successively through the valve 32, through the first pump 50, through the by-pass valve 34, through the distribution valve 36, through the tail valve 40, through the chromatography column 26 from tail port 26B to head port 26A, through the head valve 38, through the outlet valve 42 and to the waste outlet port 48. In the backward washing configuration, the generator 22 is by-passed.

In a second elution configuration (FIG. 5), the fluid circuit 24 is configured for circulating the A3 solution from the third source S3 through the chromatography column 26 from tail port 26B to head port 26A.

In the second elution configuration, the valves 32, 34, 36, 38, 40, 42 are controlled such that the A3 solution flows from the third source S3 successively through the second pump 52, through the by-pass valve 34, through the distribution valve 36, through the tail valve 40, through the chromatography column 26 from tail port 26B to head port 26A, through the head valve 38, through the outlet valve 42. In the second elution configuration, the generator 22 is by-passed.

Figure 5:
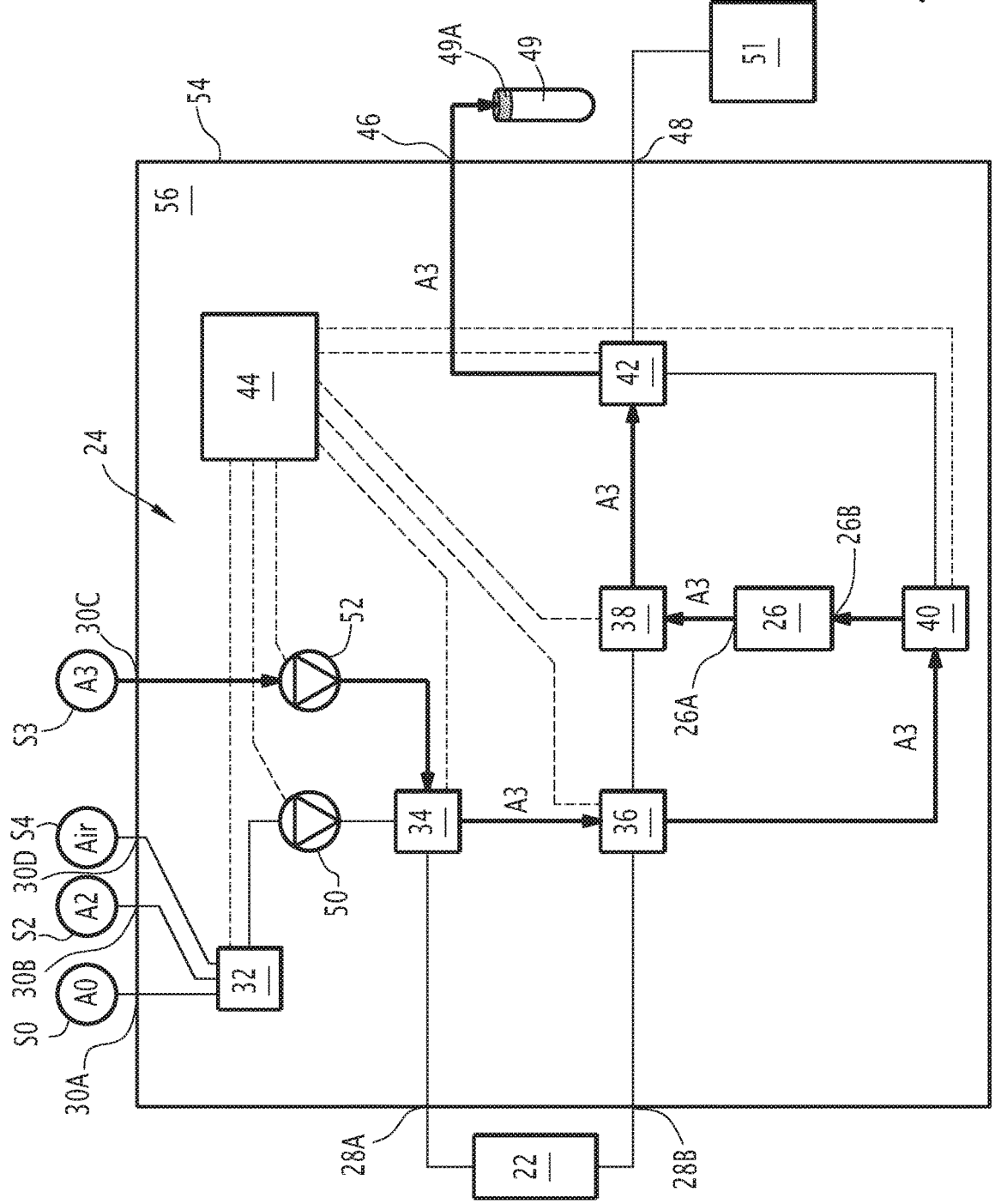

In the second elution configuration, the outlet valve 42 is controlled to flow the fluid selectively to the product outlet port 46 or the waste outlet port 48. Preferably, in a first phase (not shown), the outlet valve 42 is controlled to flow the fluid to the waste outlet port 48 and then, in a subsequent second phase, the outlet valve 42 is controlled to flow the fluid to the product outlet port 46 (FIG. 5). The first phase allows to discard the first elution fraction which aims at increasing the pH and does not contain or contain only few daughter radionuclide, whereas the second phase allows to collect the second elution fraction which actually elutes the daughter radionuclide and is enriched in the daughter radionuclide. In an alternative, the first phase is omitted and the outlet valve 42 is controlled to flow the fluid to the product outlet port 46 permanently during the second elution configuration.

In a flushing configuration (FIG. 6), the fluid circuit 24 is configured for circulating air from the fourth source S4 to the product outlet 46 and/or to the waste product outlet 48 for flushing the fluid circuit 24 with air.

In the flushing configuration, the valves 32, 34, 36, 38, 40, 42 are controlled such that the air flows from the fourth source S4 to the product outlet port 46 with passing successively through the valve 32, the pump 50, the by-pass valve 34, the distribution valve 36, the head valve 38 and the outlet valve 42.

The outlet valve 42 is controlled for directing air sequentially to one of the product outlet 46 and the waste product outlet 48 and then to the other, for flushing the corresponding fluid lines. In the flushing configuration, the generator 22 and the chromatography column 26 are by-passed.

As illustrated on FIGS. 2-6, the apparatus 20 comprises a sealed enclosure 54 defining a chamber 56 containing the fluid circuit 24. The inlet ports 30A, 30B, 30C, 30D, the connection ports 28A, 28B and the outlet ports 46, 48 allow to connect respectively sources S1, S2, S3, S4, the generator 22 and the product and waste receptacles 49, 51 to the fluid circuit 24 from outside the enclosure 54.

FIGS. 7-11, in which same or similar parts use same references, illustrate another apparatus 20 configured for the automated production of a daughter radionuclide from a parent radionuclide using a generator 22 comprising a solid medium onto which the parent nuclide is fixed and whereby the daughter nuclide is formed by radioactive decay of the parent nuclide.

The apparatus 20 of FIGS. 7-11 uses fewer valves than the apparatus of FIGS. 2-6.

The fluid circuit 24 of the apparatus 20 of FIGS. 7-11 comprises an inlet valve 32 fluidly connected to the inlet ports 30A, 30B, 30C, 30D and an outlet connected to the inlet of a pump 60. The inlet valve 32 is configured for directing fluid from selectively one of the inlet ports 30A, 30B, 30C, 30D to the inlet of the pump 60.

The fluid circuit 24 comprises a distribution valve 62 fluidly connected to the outlet of the pump 60 and to the inlet connection port 28A, the head valve 38 and the tail valve 40. The distribution valve 62 is configured for connecting the outlet of the pump 60 to selectively one of the inlet connection port 28A, the head valve 38 and the tail valve 40.

The outlet connection port 28B is fluidly connected to the fluid line connecting the distribution valve 62 to the head valve 38. Fluid exiting the generator 22 is injected into the fluid line connecting the distribution valve 62 to the head valve 38.

The head valve 38 is fluidly connected to the distribution valve 62, to a head port 26A, to the product outlet port 46 and to the waste outlet port 48. The head valve 38 is configured for selectively directing fluid from the distribution valve 62 to the head port 26A or directing fluid from the head port 26A to the outlet port 46 or directing fluid from the head port 26A to the outlet port 48.

The tail valve 40 is connected to the distribution valve 62, to a tail port 26B, to the outlet port 46 and to the outlet port 48. The tail valve 40 is configured for selectively directing fluid from the distribution valve 62 to tail port 26B, directing fluid from the tail port 26B to the outlet port 46 or directing fluid from the tail port 26B to the outlet port 48.

The apparatus 20 of FIGS. 7-11 allows configurations functionally similar to that of the apparatus of FIGS. 2-6, namely a first elution configuration, a frontward washing configuration, a backward washing configuration, a second elution configuration and a flushing configuration.

In the first elution configuration (FIG. 7), the valves 32, 62, 38, 40 are controlled such that the A0 solution flows from the first source S0 successively through the selection valve 32, through the pump 60, through the distribution valve 62 and through the generator 22, the A1 solution exiting the generator 22 circulating through the head valve 38, through the chromatography column 26 from head port 26A to tail port 26B, through the tail valve 40 and to the waste outlet port 48.

In the first washing configuration (FIG. 8), the valves 32, 62, 40, 38 are controlled such that the A2 solution flows from the second source S2 successively through the selection valve 32, through the pump 60, through the distribution valve 62, through the head valve 38, through the chromatography column 26 from head port 26A to tail port 26B, through the tail valve 40 and to the waste outlet port 48.

In the second washing configuration (FIG. 9), the valves 32, 62, 40, 38 are controlled such that the A2' solution (which is here the same as the A2 solution) flows from the second source S2 successively through the selection valve 32, through the pump 60, through the distribution valve 62, through the tail valve 40, through the chromatography column 26 from tail port 26B to head port 26A, through the head valve 38 and to the waste outlet port 48 (see arrows and references A2').

In the second elution configuration (FIG. 10), the valves 32, 62, 40, 38 are controlled such that the A3 solution flows from the third source S3 successively through the selection valve 32, through the pump 60, through the distribution valve 62, through the tail valve 40, through the chromatography column 26 from tail port 26B to head port 26A and through the head valve 38 (see arrows and references A3).

Figure 10:
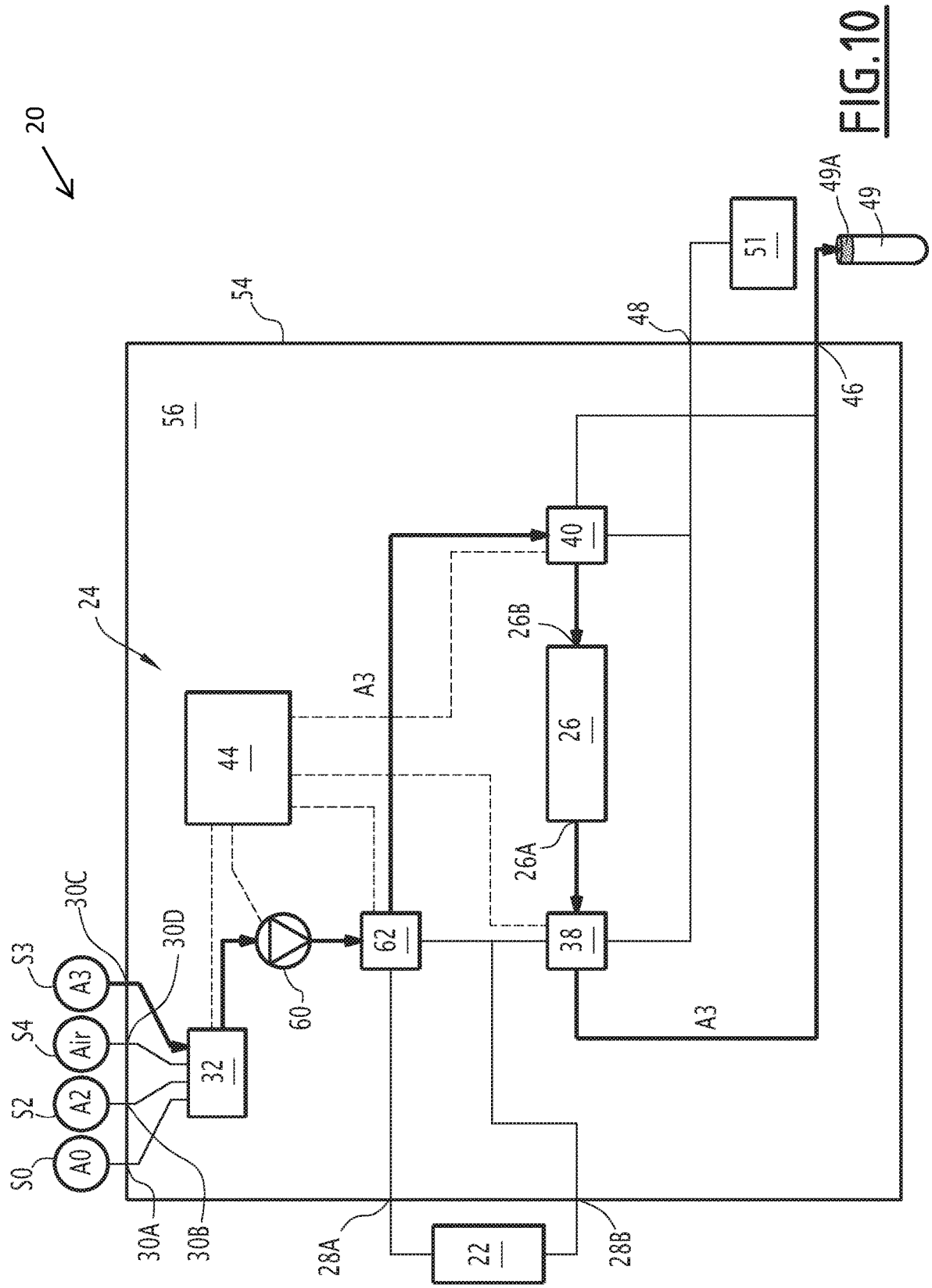

In the second elution configuration, the head valve 38 is controlled to flow the fluid selectively to the product outlet port 46 or the waste outlet port 48. Preferably, in a first phase (not shown), the head valve 38 is controlled to flow the fluid to the waste outlet port 48 and then, in a subsequent second phase, the head valve 38 is controlled to flow the fluid to the product outlet port 46 (FIG. 10). In an alternative, the first phase is omitted and the head valve 38 is controlled to flow the fluid to the product outlet port 46 permanently during the second elution configuration.

In the flushing configuration (FIG. 11), the valves 32, 62, 40, 38 are controlled such that the air flows from the fourth source S4 successively through the selection valve 32, through the pump 60, through the distribution valve 62 and through the tail valve 40. The tail valve 40 is controlled for directing air sequentially to one of the product outlet port 46 and the waste outlet port 48 and then to the other for flushing the fluid circuit 24 with air.

The apparatus of FIGS. 7-11 allows reducing the number of valves and thus makes the apparatus easier and more economical to manufacture.

Advantageously, the ports are provided with a color code for avoiding an operator to make any mistake upon connecting the S0, S2, S3, S4 sources, the generator 22 and the receptacles 49, 51 to the fluid circuit 24.

In one embodiment, the pumps 50, 52 and 60 are syringe-pumps controllable to retrieve from a source a predetermined amount of fluid and to inject said determined amount into the fluid circuit 24.

In the embodiments of FIGS. 2-6 and 7-11, the enclosure 54 prevents access to fluid circuit 24. The enclosure comprises a lockable access device such as a door to allow access to the chamber 56. This makes it possible to prevent any non-qualified persons from accessing the fluid circuit 24 of the apparatus 20, particularly the components having some radiological activity, or the components whose functioning can be damaged.

In the embodiments of FIGS. 2-6 and 7-11, the generator 22 is located outside the enclosure 54 and is removably connectable to the fluid circuit 24 via the connection ports 28A, 28B. This allows replacing the generator 22 by another similar generator. Indeed, due to the lifetime of the parent radionuclide, the generator can only be used for a limited period of time. For example, the radium 224 has a half-life time of 3.66 days.

In a similar manner, the chromatography column 26 can be disconnected from the fluid circuit 24 for replacement by another similar column.

The general dimensions of the various components of the apparatus 20 are relatively small, which makes it possible to arrange them in an enclosure 54 which is also small in size. The apparatus 20 can therefore be a portable apparatus that can be used close to the area of usage of the daughter radionuclide, e.g. the lead 212.

The apparatus 20 has several inlet ports 30A, 30B, 30C, 30D to which the different sources S0, S2, S3, S4 of fluids are connected to the apparatus 20. Preferably, each source S0, S2, S3, S4 is associated with a respective inlet port 30A, 30B, 30C, 30D.

In order to avoid any reversal between the sources S0, S2, S3, S4, the apparatus 20 comprises so-called failsafe features allowing an operator to correctly connect each source S0, S2, S3, S4 to the corresponding inlet port 30A, 30B, 30C, 30D.

According to an embodiment, the failsafe features are visual features, e.g. a color coding. Each source S0, S2, S3, S4 has a color code and the corresponding inlet port 30A, 30B, 30C, 30D has the same color code.

Alternatively or optionally, each source S0, S2, S3, S4 and the corresponding inlet port 30A, 30B, 30C, 30D has complementary fool proofing shapes such that each source S0, S2, S3, S4 is connectable only to the corresponding inlet port 30A, 30B, 30C, 30D. In this way it becomes impossible to connect a source to an inlet port with which it is not associated, thus preventing any human error.

Each apparatus of FIGS. 2-6 and 7-11 makes it possible to implement the method of the invention in an automated manner. The valves 32, 34, 36, 38, 40, 42; 32, 62, 38, 40 and the pumps 50, 52, 60 are automatically controlled by the control unit 44 for implementing the method of the invention.

In operation, the daughter radionuclide is produced in the generator 22 by radioactive decay of the parent radionuclide and the daughter radionuclide is retained on the first solid medium.

The control unit 44 is configured for successively operating the first elution configuration, the frontward washing configuration, the backward washing method and the second elution method, and, optionally, the purging method.

Figure 7:
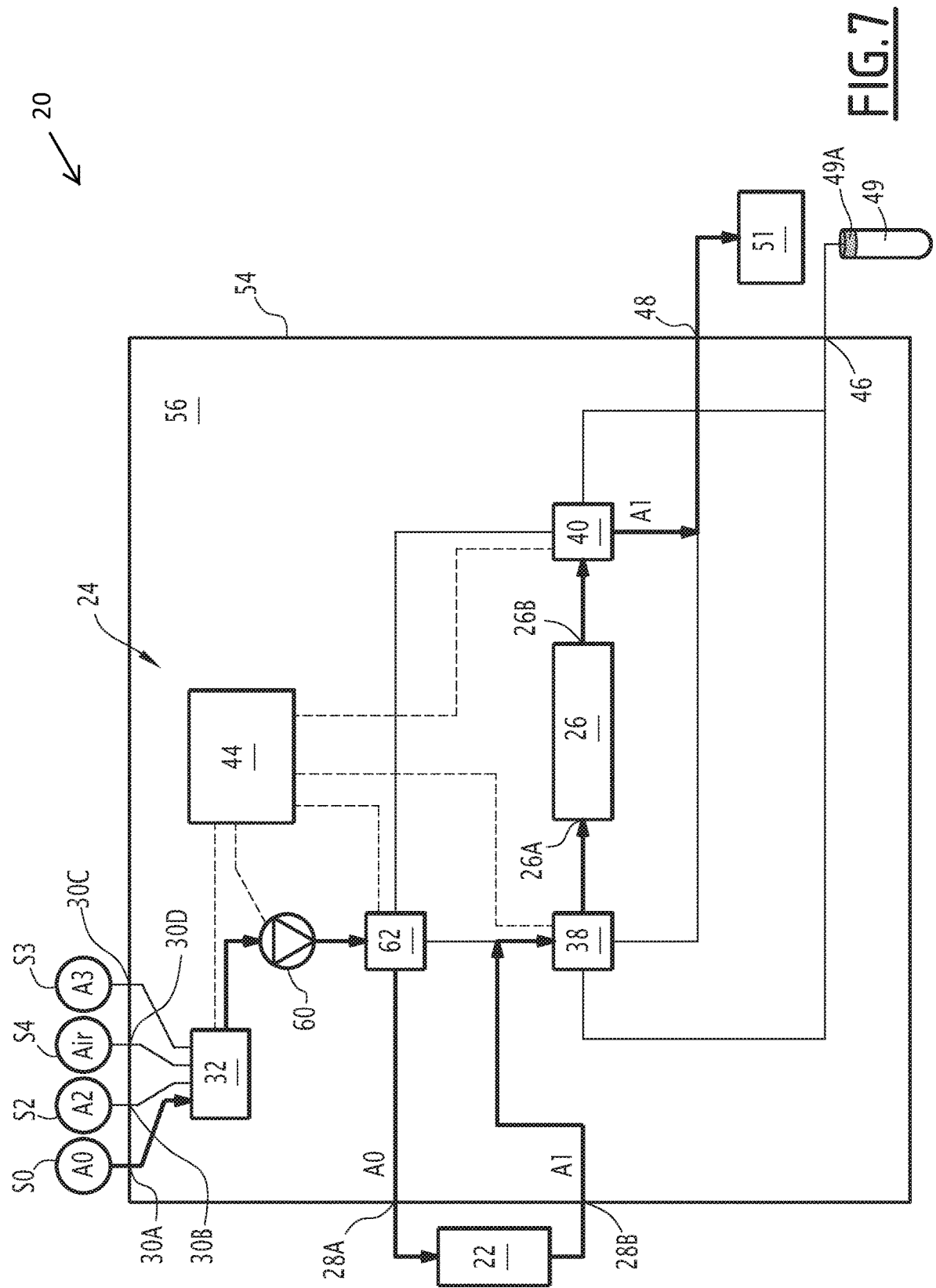
FIGS. 7-11 are diagrammatic representations of another embodiment of an apparatus for implementing the method according to the invention, in different configurations.

Extraction of the Daughter Radionuclide (FIG. 2 or 7)

The apparatus 20 is configured in the first elution configuration. The A0 solution is circulated through the generator 22 and the A1 solution containing the daughter solution exits the generator 22.

Loading to the Chromatography Column (FIG. 2 or 7)

The apparatus 20 still being in the first elution configuration, the A1 solution exiting the generator 22 is circulated through the chromatography column 26 from head to tail. The daughter radionuclide is retained by the second solid medium contained in the chromatography column 26.

Figure 3:
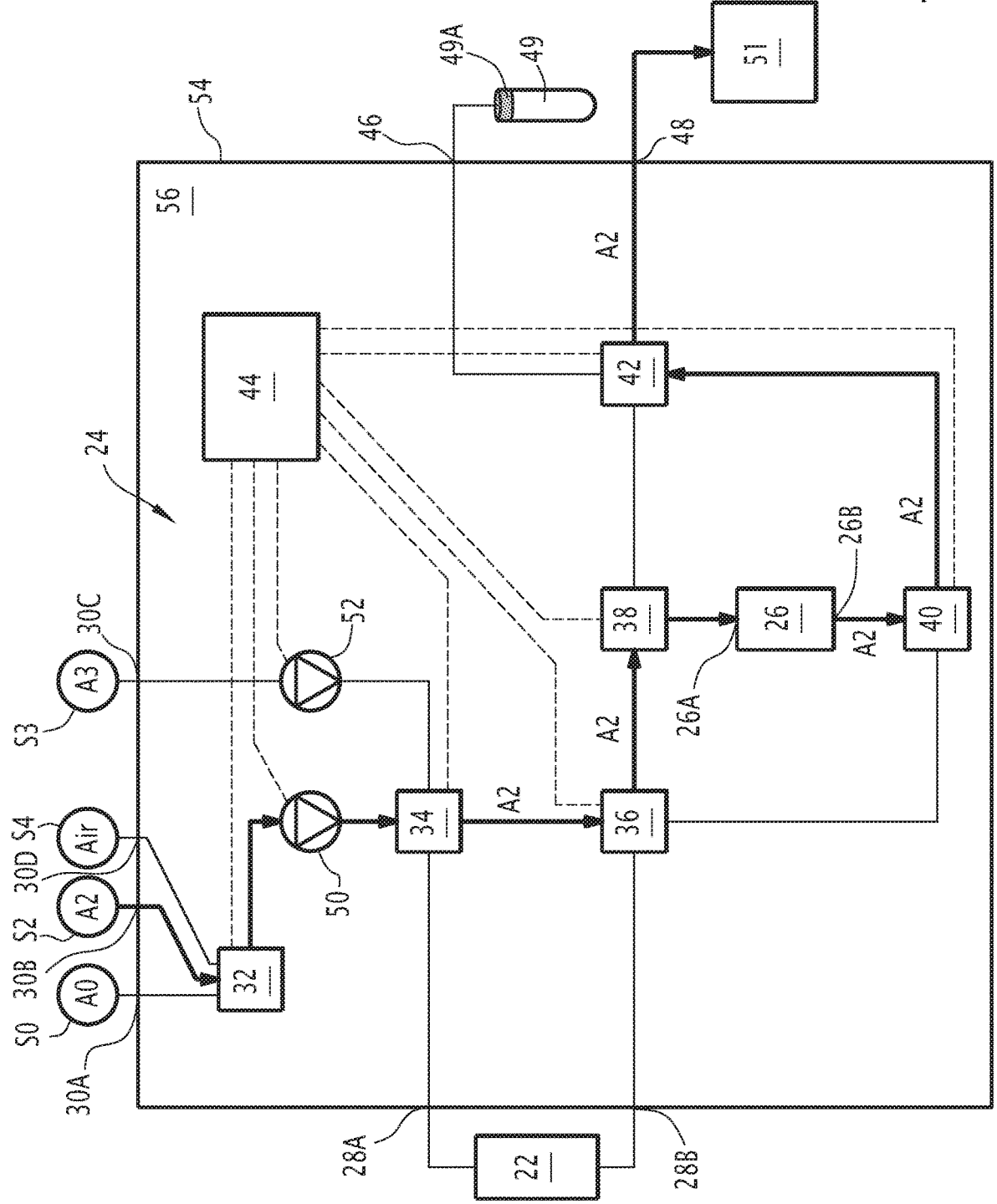
Figure 8:
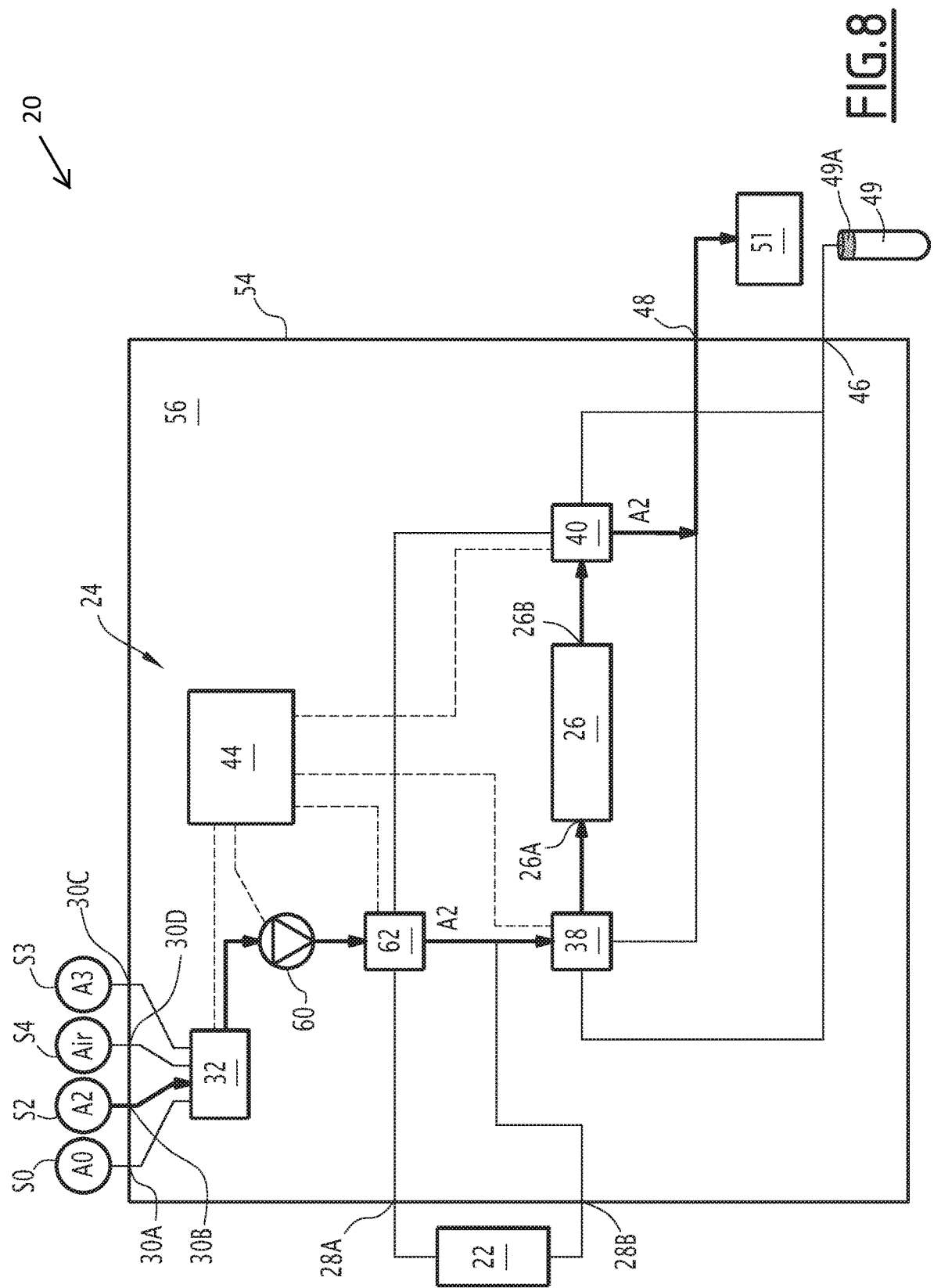

Frontward Washing of the Chromatography Column (FIG. 3 or 8)

The apparatus 20 is configured in the first washing configuration. The A2 solution is circulated through the chromatography column 26 from head to tail. The A2 solution removes radiological and chemical impurities from the second solid medium while the daughter radionuclide is retained by the second solid medium.

Figure 4:
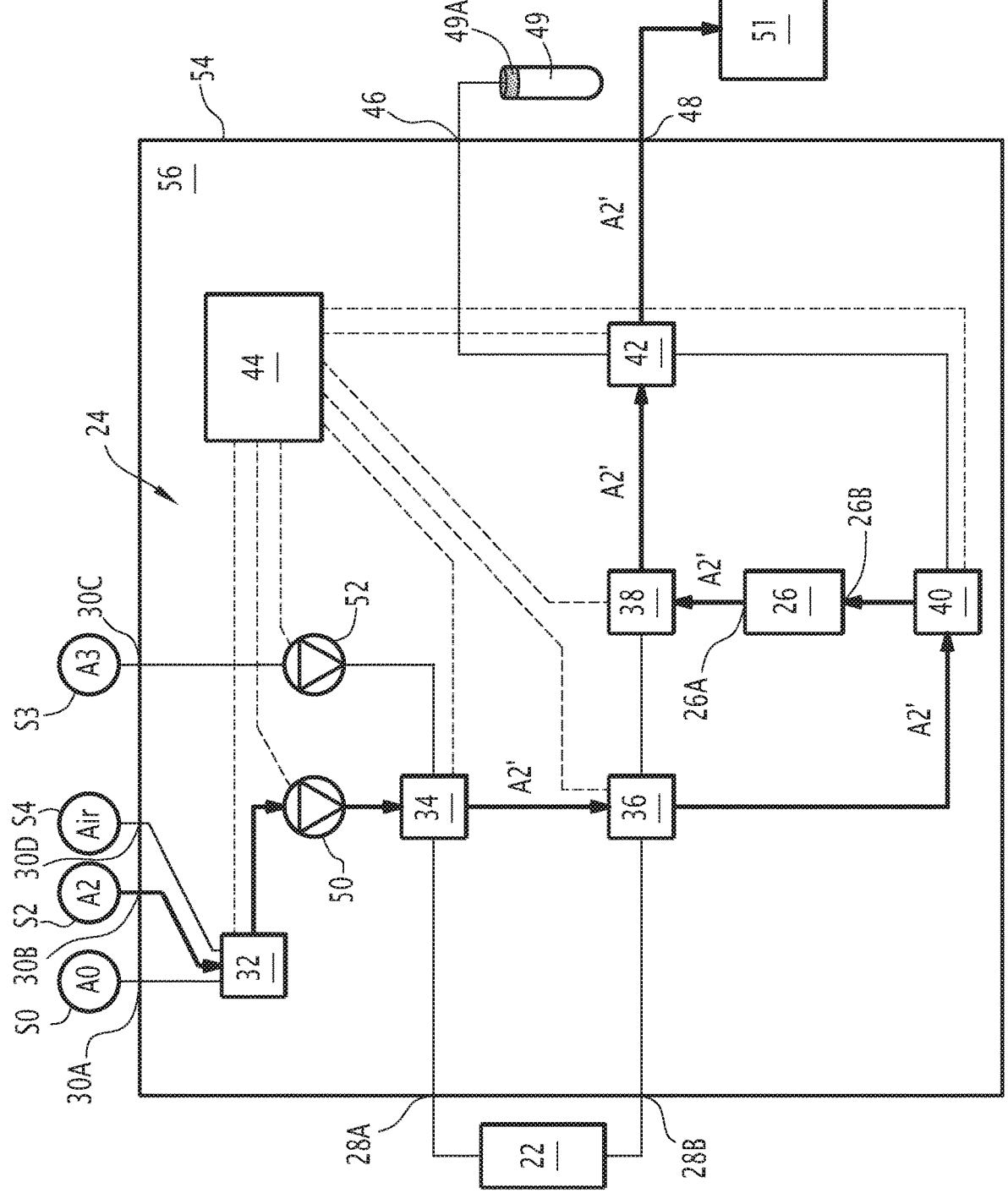
Figure 9:
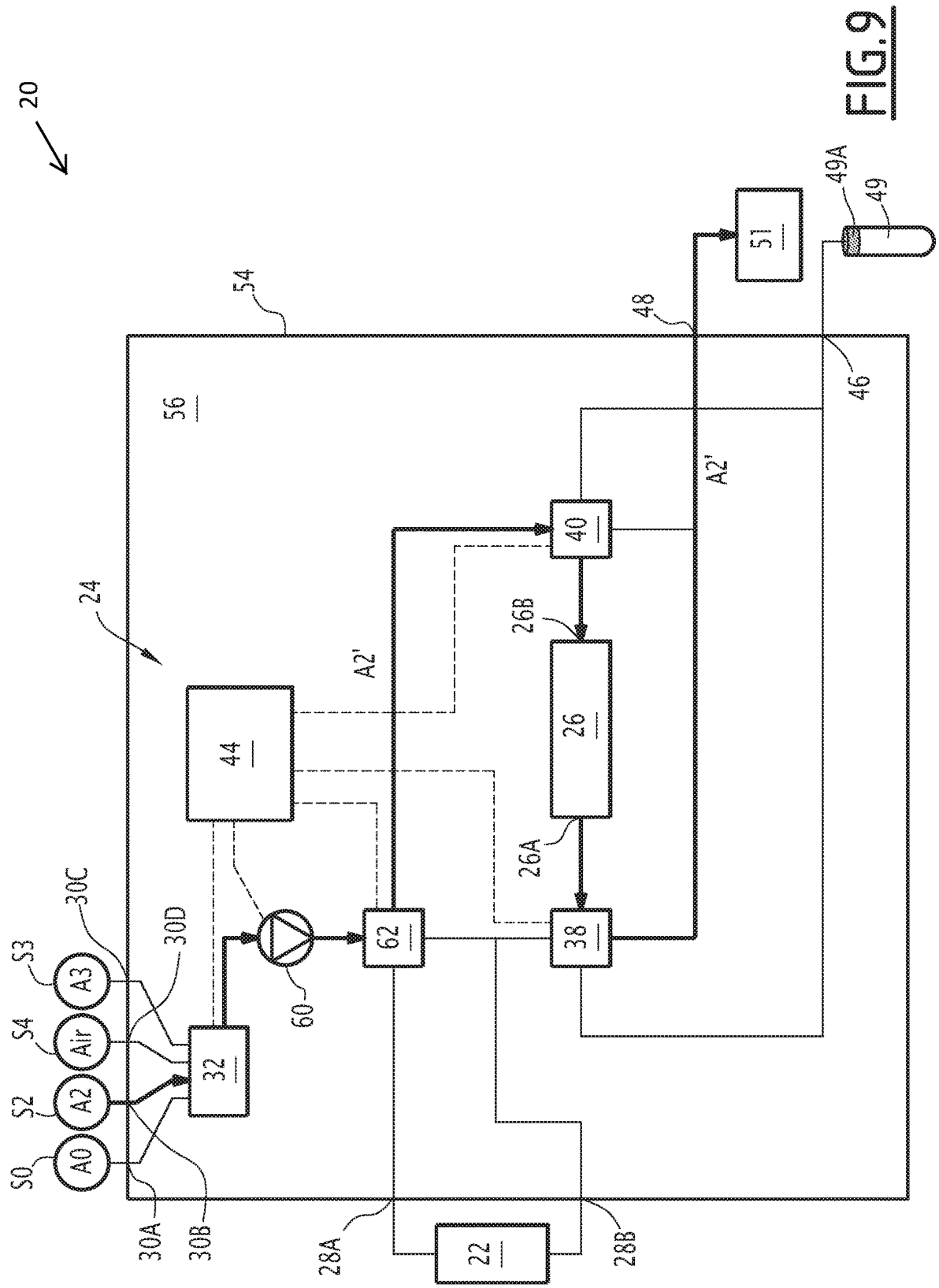

Backward Washing of the Chromatography Column (FIG. 4 or 9)

The apparatus 20 is configured in the backward washing configuration. The A2' solution is circulated through the chromatography column 26 from tail to head. The A2' solution removes radiological and chemical impurities from the second solid medium while the daughter radionuclide is retained by the second solid medium.

Second Elution of the Chromatography Column (FIG. 5 or 10)

The apparatus 20 is configured in the second elution configuration. The A3 solution is circulated through the chromatography column 26 from tail to head. The A3 solution removes the daughter radionuclide from the second solid medium and is collected in a collecting device, e.g. in the product flask 49.

Preferably, in a first phase of the second elution, the fluid flows to the waste outlet port 48 and then, in a subsequent second phase of the second elution, the fluid flows to the product outlet port 46. The first phase allows discarding the first elution fraction which aims at increasing the pH and does not contain or contain only few daughter radionuclide, whereas the second phase allows to collect the second elution fraction which actually elutes the daughter radionuclide and is enriched in the daughter radionuclide. In an alternative, the first phase is omitted and the fluid flows to the product outlet port 46.

Figure 6:
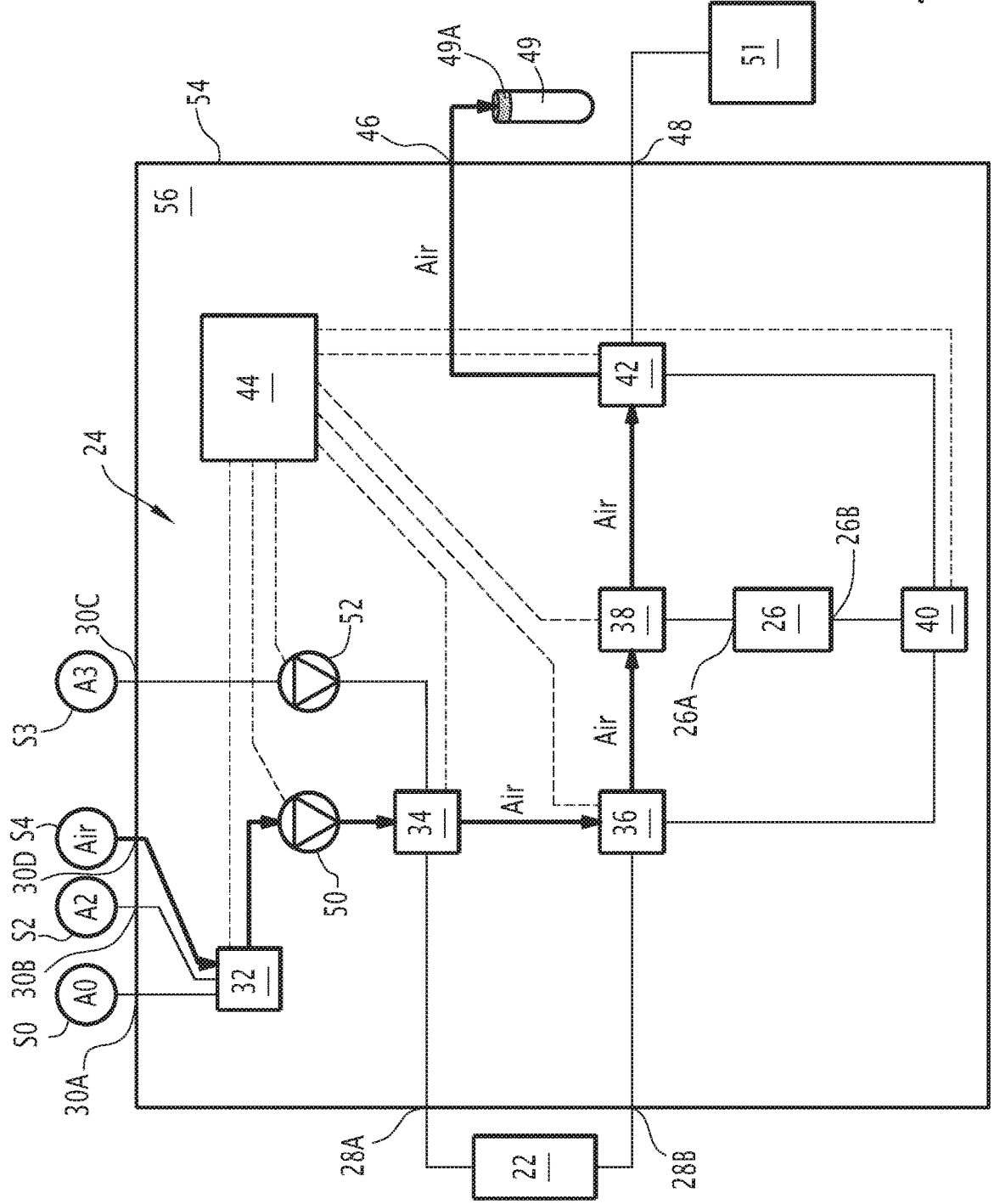
Figure 11:
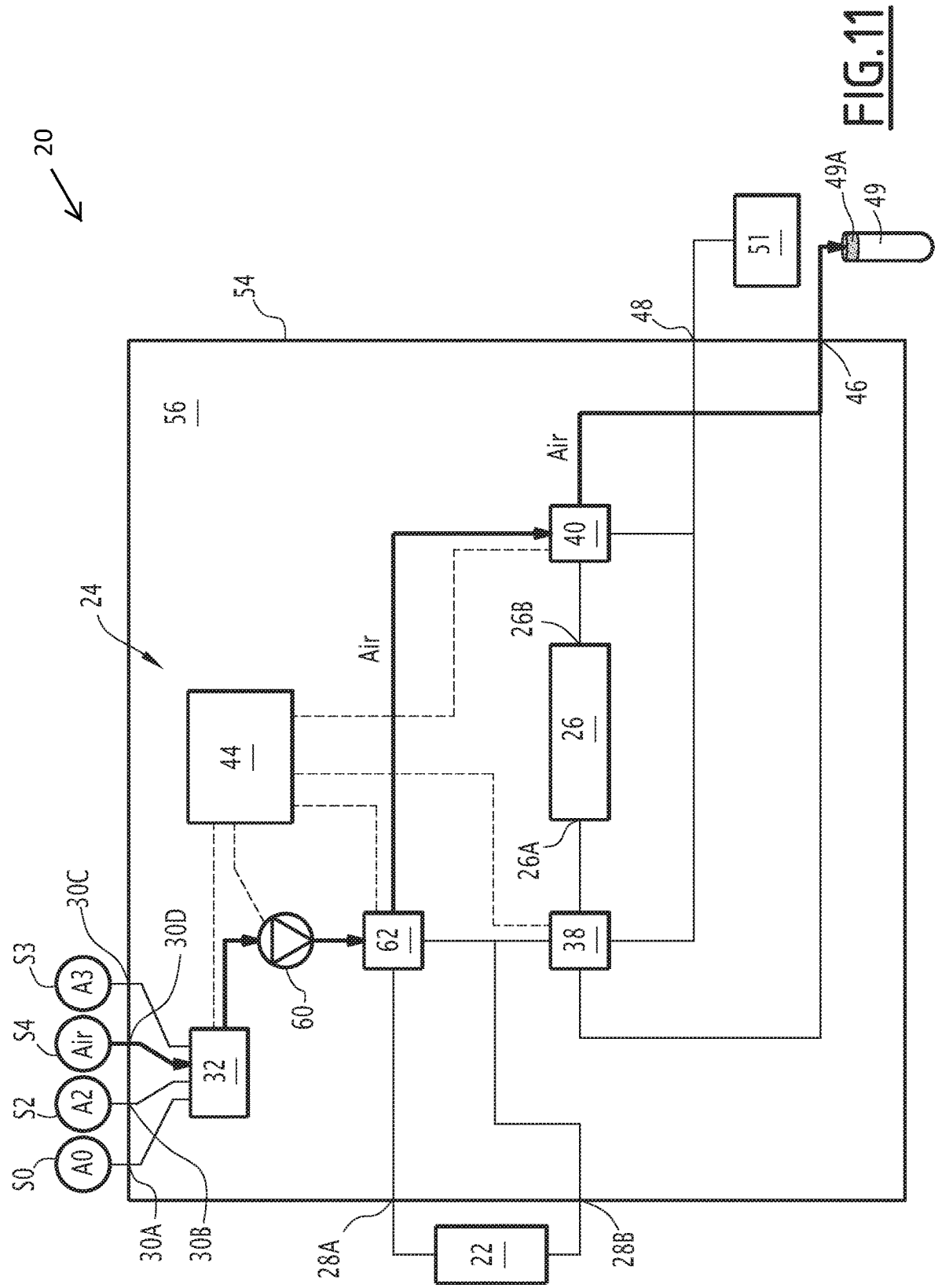

Purging of the Apparatus (FIG. 6 or 11)

The apparatus 20 is configured in the flushing configuration. The purified air is circulated from the source S4 to product receptacle 49 and/or the waste receptacle 51 to flush components of the fluid circuit 24.

The following examples are given as an illustration of an embodiment of the invention, for non-limiting purposes.

EXAMPLES

Example 1

Lead 212 was produced with an apparatus similar to the one that has just been described and by a process comprising the following steps:

A radium 224 generator containing 400 mg of a cation exchange resin (company BIO-RAD—reference AG™ MP50) as the solid medium was used. The resin was initially loaded with 30 mL of a solution containing 173 MBq of radium 224 of radiological purity greater than 99.5% (such as that determined by γ spectrometry).

The system without the generator was loaded with 2 mL of a 2N HCl solution at the loading rate of 1 mL/min.

The generator was then eluted with 5 mL of a 2N HCl solution at the elution rate of 0.5 mL/min. The resulting solution was then loaded on the head of the chromatography column.

A ready-to-use chromatography column containing 80±10 mg of "Pb resin" (company TRISKEM International) as the stationary phase was washed with 1 mL of a 0.1N HCl solution at the washing rate of 0.5 mL/min.

It was then washed in a backward fashion with 1 mL of a 0.1N HCl solution at the washing rate of 0.5 mL/min.

0.5 mL of an aqueous solution containing 0.4 mol/L of ammonium acetate (pH 6.5) was used to load the system (loading rate: 0.5 mL/min).

1 mL of an aqueous solution containing 0.4 mol/L of ammonium acetate (pH 6.5) was used to elute the Pb column in a backward fashion (elution rate: 0.25 mL/min) to elute the lead 212 from the stationary phase of the chromatography column and recover it at the head of the column.

The system was then flushed with sterile air (0.2 µm filter) (1 mL at 1 mL/min).

Radium 224 was left to generate lead 212 for 19 h and 82 MBq of lead 212 were obtained.

After a second delay of 24*h*, the system yielded 80 MBq of lead 212. A third cycle after another 24 h lead to 64 MBq of lead 212.

The lead 212 obtained exhibited a radiological purity of more than 99.95%, generally about 99.995%. The grade is such that even radium 224 was not detectable after 1 week.

Its chemical purity was characterized by the presence, in the lead 212 elution solution, of:
 less than 25 ppb (parts per billion) of lead (other than lead 212) and manganese;
 less than 2 ppb of cobalt, copper, molybdenum, cadmium, thorium, tungsten and mercury;
 less than 2 ppm of vanadium, iron and zinc.

Its bacteriological purity was characterized by sterility and less than 0.5 endotoxin unit/mL; and this in less than 20 minutes between the start of the extraction of lead 212 from the radium 224 generator and the end of the filling of the flask 46 with purified lead 212.

Example 2

Lead 212 was produced with an apparatus similar to the one that has just been described and by a process comprising the following steps:

A radium 224 generator containing 400 mg of a cation exchange resin (company BIO-RAD—reference AG™ MP50) as the solid medium was used. The resin was initially loaded with 24 mL of a solution containing 169 MBq of radium 224 of radiological purity greater than 99.5% (such as that determined by γ spectrometry).

The system without the generator was loaded with 2 mL of a 2N HCl solution at the loading rate of 1 mL/min.

The generator was then eluted with 5 mL of a 2N HCl solution at the elution rate of 0.5 mL/min. The resulting solution was then loaded on the head of the chromatography column.

A ready-to-use chromatography column containing 80±10 mg of "Pb resin" (company TRISKEM International) as the stationary phase was washed with 1 mL of a 0.1N HCl solution at the washing rate of 0.5 mL/min.

It was then washed in a backward fashion with 1 mL of a 0.1N HCl solution at the washing rate of 0.5 mL/min.

0.5 mL of an aqueous solution containing 0.4 mol/L of ammonium acetate (pH 6.5) was used to load the system (loading rate: 0.5 mL/min).

1 mL of an aqueous solution containing 0.4 mol/L of ammonium acetate (pH 6.5) was used to elute the Pb column in a backward fashion (elution rate: 0.25 mL/min) to elute the lead 212 from the stationary phase of the chromatography column and recover it at the head of the column.

The system was then flushed with sterile air (0.2 μm filter) (1 mL at 1 mL/min).

Radium 224 was left to generate lead 212 for 20 h and 81 MBq of lead 212 were obtained, After a second delay of 21 h, the system yielded 71 MBq of lead 212. A third cycle after another 9 h lead to 40 MBq of lead 212.

The lead 212 obtained exhibited a radiological purity of more than 99.95%, generally about 99.995%. The grade is such that even radium 224 was not detectable after 1 week.

Its chemical purity was characterized by the presence, in the lead 212 elution solution, of:
less than 17 ppb (parts per billion) of lead (other than lead 212) and manganese;
less than 2 ppb of cobalt, tungsten, thorium and mercury;
less than 0.1 ppm of copper, molybdenum, iron and cadmium;
less than 3 ppm of vanadium and zinc.

Its bacteriological purity was characterized by sterility and less than 0.5 endotoxin unit/mL; and this in less than 20 minutes between the start of the extraction of lead 212 from the radium 224 generator and the end of the filling of the flask 46 with purified lead 212.

What is claimed is:

1. A process for producing a daughter radionuclide from a parent radionuclide comprising the steps of:
    loading the parent radionuclide on a first solid medium contained in a generator and onto which the parent radionuclide is retained and whereby the daughter radionuclide is formed by radioactive decay of the parent radionuclide;
    eluting the first solid medium with a A0 solution so as to recover a A1 solution comprising the daughter radionuclide;
    loading the A1 solution or a A1' solution onto a head of a second solid medium contained in a chromatography column, the A1' solution being formed by adjusting a pH of the A1 solution;
    first washing the second solid medium with a A2 solution;
    second washing the second solid medium with a A2' solution;
    eluting the daughter radionuclide with a A3 solution,
    wherein in the chromatography column the first washing step is conducted from head to tail of the column and the second washing step and the second eluting step are conducted from tail to head of the column.

2. The process according to claim 1 wherein the daughter radionuclide is lead 212.

3. The process according to claim 1 wherein the parent radionuclide is chosen from radium 224, thorium 228 and their mixtures.

4. The process according to claim 1 wherein the parent radionuclide is radium 224.

5. The process according to claim 1 further comprising air-flushing the second solid medium.

6. The process according to claim 1 wherein the A2 and A2' solutions, identical or different are chosen among solutions having an acidity corresponding to that of an aqueous solution of a strong acid of concentration ranging from 0.1 to 0.5 mole/L.

7. The process according to claim 6 wherein the A2 and A2' solutions, identical or different are chosen among solutions having an acidity corresponding to that of an aqueous solution of a strong acid of concentration equal to 0.5 mole/L.

8. The process according to claim 1 wherein the A2 and A2' solutions are chosen from HCl or nitric acid solutions.

9. The process according to claim 1 wherein the A3 solution is a solution having a pH ranging from 5 to 9.

10. The process according to claim 9 wherein the A3 solution is an ammonium acetate solution.

11. The process according to claim 1 further comprising the following steps:
    loading radium 224 on a cation exchange resin contained in a generator;
    eluting with a 2 N hydrochloric acid solution so as to recover a A1 solution comprising lead 212;
    loading the A1 solution on the stationary phase of a liquid chromatography column;
    washing the column from head to tail with a A2 solution of 0.1 N hydrochloric acid;
    washing from the tail to head of the column with the same A2 solution;
    eluting from the tail to the head of the column with a A3 solution of 0.4 N ammonium acetate; and
    air flushing.

12. The process according to claim 1 further comprising a preliminary step of generating the parent radionuclide from a source radionuclide in a generator from which the parent radionuclide is eluted.

13. The process according to claim 2, wherein the source radionuclide is thorium 228, the parent radionuclide is radium 224 and the daughter radionuclide is lead 212.

* * * * *